(12) United States Patent
Thompson

(10) Patent No.: US 11,697,259 B2
(45) Date of Patent: Jul. 11, 2023

(54) ANNULAR RING AND NON-PNEUMATIC TIRE

(71) Applicant: Camso, Inc., Magog (CN)

(72) Inventor: Ronald Hobart Thompson, Marietta, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 165 days.

(21) Appl. No.: 17/240,704

(22) Filed: Apr. 26, 2021

(65) Prior Publication Data

US 2021/0245463 A1 Aug. 12, 2021

Related U.S. Application Data

(63) Continuation of application No. 16/208,916, filed on Dec. 4, 2018, now Pat. No. 11,014,316, which is a
(Continued)

(51) Int. Cl.
| | |
|---|---|
| *B29D 30/00* | (2006.01) |
| *B29D 30/02* | (2006.01) |
| *B60C 7/18* | (2006.01) |
| *B60C 7/00* | (2006.01) |
| *B29L 30/00* | (2006.01) |

(52) U.S. Cl.
CPC ............ *B29D 30/02* (2013.01); *B60C 7/18* (2013.01); *B29L 2030/006* (2013.01); *B60C 2007/005* (2013.01)

(58) Field of Classification Search
CPC .. B60C 7/102; B60C 7/12; B60C 7/18; B60C 7/22
See application file for complete search history.

(56) References Cited

U.S. PATENT DOCUMENTS 5,343,916 A * 9/1994 Duddey .................... B60C 7/12
152/5
6,467,519 B1 * 10/2002 Owen ....................... B60C 7/24
301/64.704
(Continued)

FOREIGN PATENT DOCUMENTS

WO WO2012/030519 A 3/2012

*Primary Examiner* — Hau V Phan
(74) *Attorney, Agent, or Firm* — John Steckler Schwab

(57) ABSTRACT

The present invention provides an annular beam of monolithic construction of one homogeneous material and a related efficient, low-cost non-pneumatic tire. Specific geometric design, combined with nonlinear elastomer physical properties, enable the suppression of all reinforcing belts, continuous fibers, or other strengthening layers in the annular beam. The annular beam consists of at least two bands that are continuous in the circumferential direction and connected by a web geometry. The non-pneumatic tire consists of the annular beam, a ground contacting portion, a central wheel, and a plurality of web spokes that connect the wheel and beam. When the tire is loaded to a design load against a flat surface over a design contact length, a contact area of essentially uniform pressure is produced, while the load is transmitted from the beam to the hub via tension in the web spokes. The tire can be economically manufactured.

16 Claims, 12 Drawing Sheets

Related U.S. Application Data continuation of application No. 15/677,391, filed on Aug. 15, 2017, now Pat. No. 10,166,732, which is a continuation of application No. 14/304,217, filed on Jun. 13, 2014, now Pat. No. 9,751,270.

(60) Provisional application No. 61/835,549, filed on Jun. 15, 2013.

(56) References Cited

U.S. PATENT DOCUMENTS

| | | | |
|---|---|---|---|
| 6,615,885 B1* | 9/2003 | Ohm | B60B 9/26 152/17 |
| 7,201,194 B2* | 4/2007 | Rhyne | B60C 9/20 152/5 |
| 9,056,524 B2* | 6/2015 | Lee | B60B 27/02 |
| 2004/0012246 A1* | 1/2004 | Rhyne | B60B 1/0223 301/55 |
| 2006/0113016 A1* | 6/2006 | Cron | B60C 7/18 152/11 |
| 2007/0267116 A1* | 11/2007 | Rhyne | B60C 7/18 152/246 |
| 2011/0024008 A1* | 2/2011 | Manesh | B60C 7/22 152/5 |
| 2011/0030866 A1* | 2/2011 | Fadel | B60C 7/18 152/311 |

* cited by examiner

*Fig. 16* – Simple example for beam web geometry
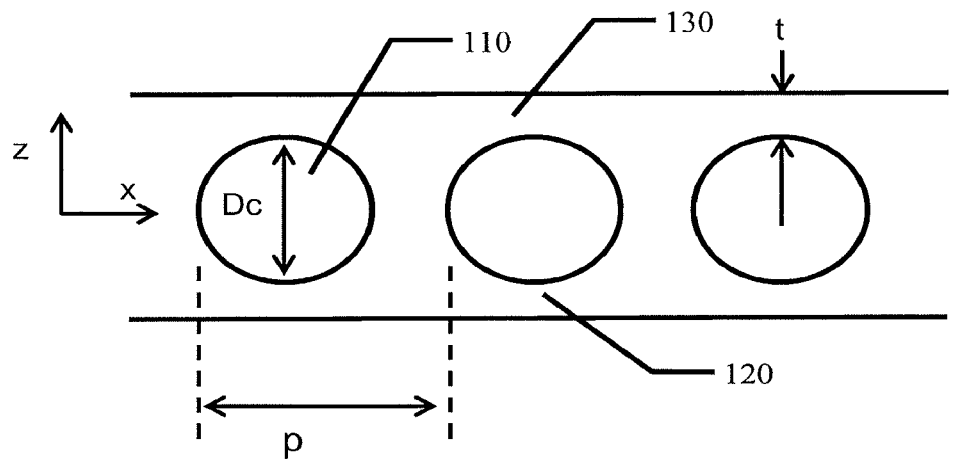
*Fig. 17* – FEA results, with L = 60 mm, E = 1, $\upsilon$ = 0.45, Rc = 10 mm, t = 2 mm
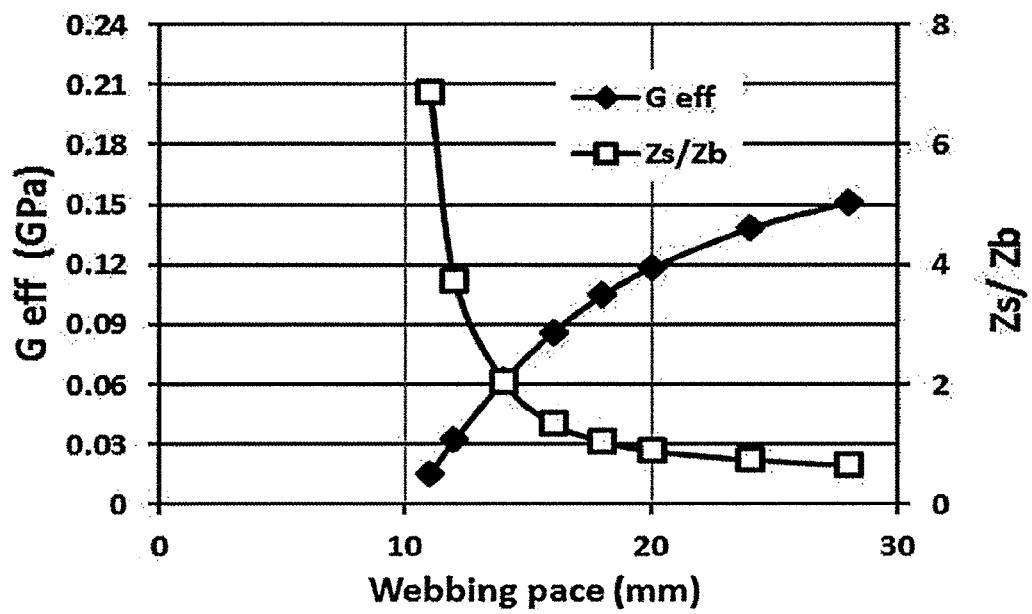

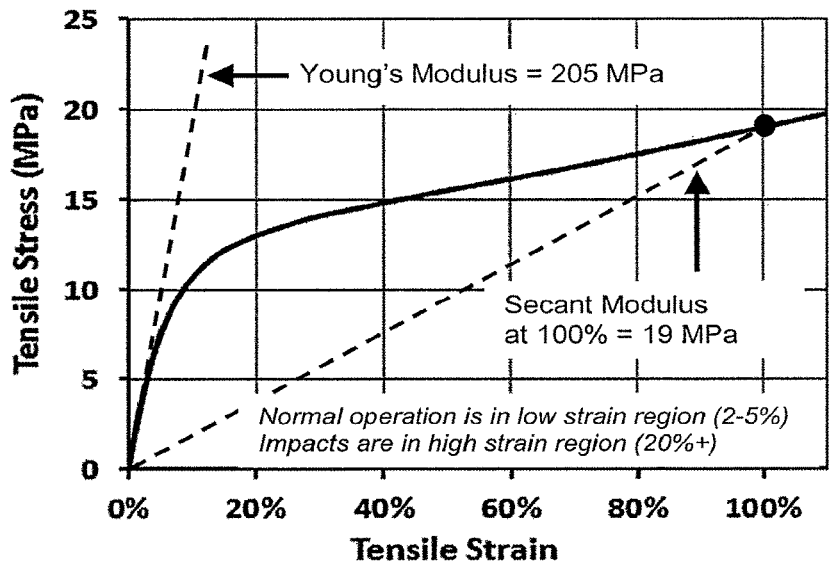
*Fig. 20* - Tensile Stress vs. Tensile strain for Imuthane PET-95A, cured with MCDEA
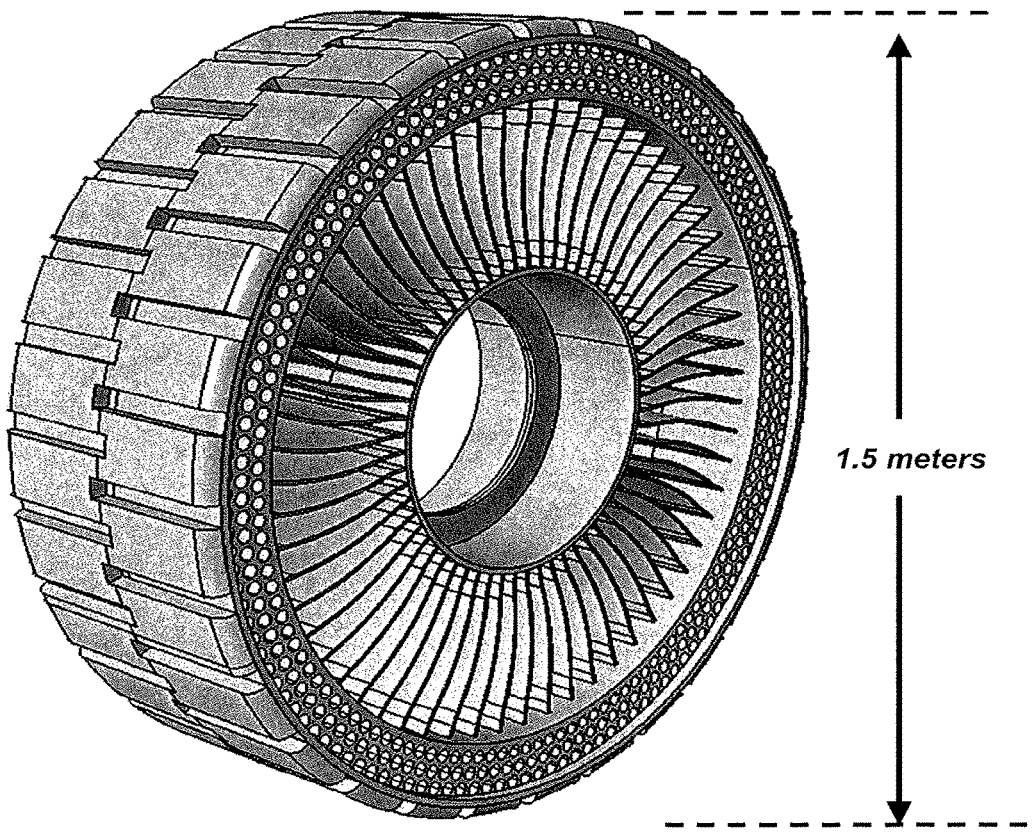
*Fig. 21*
1.5 meters

ANNULAR RING AND NON-PNEUMATIC TIRE

PRIORITY CLAIM

This is a Continuation of application Ser. No. 16/208,916 filed Dec. 4, 2018, which is a Continuation of application Ser. No. 15/677,391 filed Aug. 15, 2017, which is a Continuation of U.S. patent application Ser. No. 14/304,217 filed Jun. 13, 2014, which claims the benefit of the benefit of U.S. Provisional Patent No. 61/835,549 filed Jun. 15, 2013. The disclosure of the prior applications is hereby incorporated by reference herein in their entirety. Furthermore, where a definition or use of a term in a reference, which is incorporated by reference herein, is inconsistent or contrary to the definition of that term provided herein, the definition of that term provided herein applies and the definition of that term in the reference does not apply.

TECHNICAL FIELD OF THE INVENTION

The present invention is in the field of non-pneumatic tires and related technologies. The application scope includes low-cost, efficient designs for tires. In manufacturing, the field includes high-pressure thermoplastic injection, reaction injection, and cast molding. The material science field involves thermoplastic and thermoset elastomers having specific nonlinear mechanical properties.

BACKGROUND OF THE INVENTION

Pneumatic tires offer high load capacity per unit mass, along with a large contact area and relatively low vertical stiffness. High contact area results in the ability to both efficiently generate high tangential forces and obtain excellent wear characteristics. However, pneumatic tires are also prone to flats. Well known in the patent literature, non-pneumatic tires offer flat-free operation, yet generally contain some compromise.

Higher cost is often associated with non-pneumatic tires when complex assemblages of composite materials are used. Related to this, production methodologies can be laborious. For example, U.S. Pat. No. 7,201,194 discloses a non-pneumatic tire containing an annular band which is comprised of at least two inextensible membrane-like reinforcing layers, which are separated by an elastomeric layer. This annular band is then affixed to a central wheel via flexible spokes in a web design. This composite composition suggests a complex manufacturing process. High production costs could be involved.

Conversely, U.S. Pat. No. 6,615,885 discloses a non-pneumatic tire that can be fabricated without composite reinforcement. The design consists of a rim connected to a hub via curved spokes. The spokes are sufficiently rigid such that loads are transmitted via bending. Such a structure works acceptably well for very small tires and low loads; however, one skilled in the art of non-pneumatic structures can show that this technological approach would result in high tire mass for applications supporting higher loads in larger-scale applications.

U.S. Pat. No. 7,013,939 discloses a non-pneumatic tire consisting of a simple elastomeric band, a hub, and connecting spokes which act primarily in tension. As with U.S. Pat. No. 6,615,885, this solution works for very small tires and low loads. However, at higher loads with larger tire dimensions, one skilled in the art of non-pneumatic tire design can show that the contact area characteristics become strongly degraded. This would result in a loss of performance.

US Patent Application US2012/0234444 A1 discloses a non-pneumatic tire with an annular reinforcing web, made of a homogeneous material. However, the disclosed structure supports load via compression. The generally radial spokes are thick and designed to act as columns under normal operation. Thus, the distance between the outer tire diameter and the rigid wheel diameter must be relatively small, in order to resist buckling under high loads. Therefore, the absorbed energy potential—a principle virtue of the pneumatic tire—may be limited in this tire design.

Finally, U.S. Pat. No. 8,517,068 B2 discloses a resilient wheel that operates similarly to the invention of U.S. Pat. No. 7,201,194, except that the circumferential membranes are connected by discrete cylindrical support elements. Here, the advantages could include lower weight and the ability to overcome temperature limitations associated with elastomers. However, the assemblage of these disparate elements could be laborious and expensive.

The present invention breaks these compromises by disclosing a non-pneumatic tire that, in a preferred embodiment, can be constructed from a single homogeneous material, is light-weight, capable of large deflection, and obtains a large, constant pressure contact area. Structure geometries and non-linear material properties are disclosed that accomplish the same function as more complicated designs of prior art. In particular, prior art often employs reinforcements that behave like inextensible membranes, as well as sandwich composite constructions. Conversely, the present design is elastomeric, has no membrane-like behavior, and contains no reinforcement. While the invention has elegant simplicity, the principles of operation are not readily apparent to one of ordinary skill in the art of tire design.

While having potentially complex features, the geometries disclosed in the present invention are generally suitable for realization in the thermoplastic injection, cast, or reaction injection molding process. These practical attributes result in lower cost when produced in large volume, yet do not come at the expense of the aforementioned primary performance attributes of a pneumatic tire.

Second stage processes can be applied to this invention. For example, a non-pneumatic tire with a thermoplastic material can be designed, per procedures disclosed in this application. Then, a tread material and tread pattern can be affixed to a radially exterior extent of the annular beam. This can be accomplished via retreading procedures, by a $2^{nd}$ stage injection process, or by co-injection.

SUMMARY OF THE INVENTION

A full and enabling disclosure of the present subject matter, including the best mode thereof, directed to one of ordinary skill in the art, is set forth in the specification, which makes reference to the appended figures.

Figure 14:
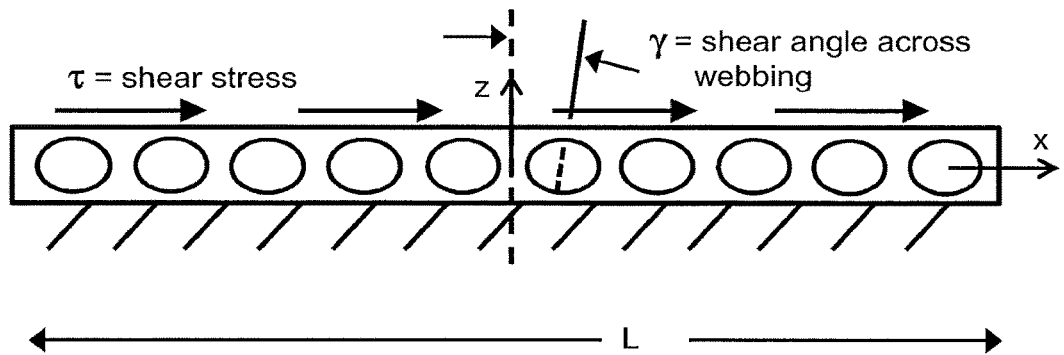
FIG. 14 is a Finite Element Model (FEM) of a straight beam with two continuous bands connected by webbing geometry subjected to simple shear.
Figure 15:
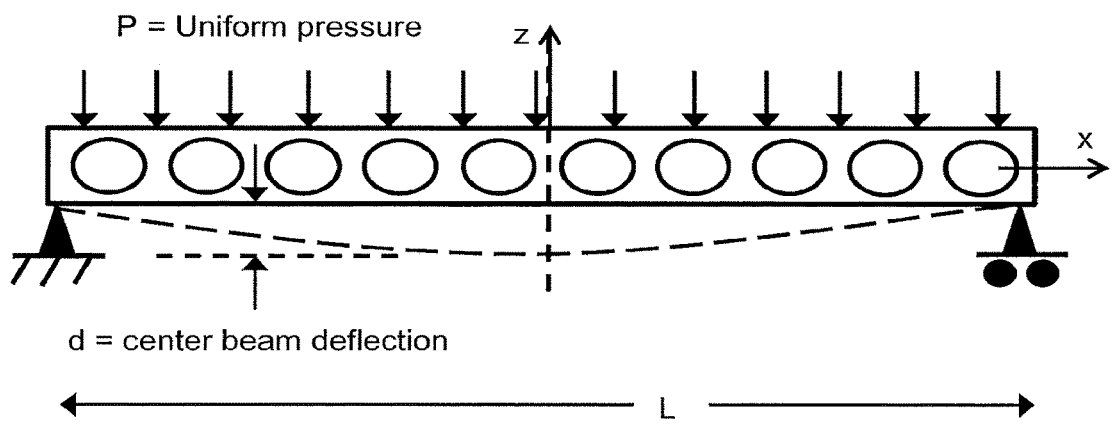
FIG. 15 is a FEM of a simply supported straight beam with two continuous bands connected by webbing geometry subjected to a uniform distributed load.

FIG. 16 gives a simple example geometry definition of the beam used in the FEM models of FIG. 14 and FIG. 15.

FIG. 17 shows FEM results of models from FIG. 14 and FIG. 15, when using geometry definition given in FIG. 16.

Figure 18:
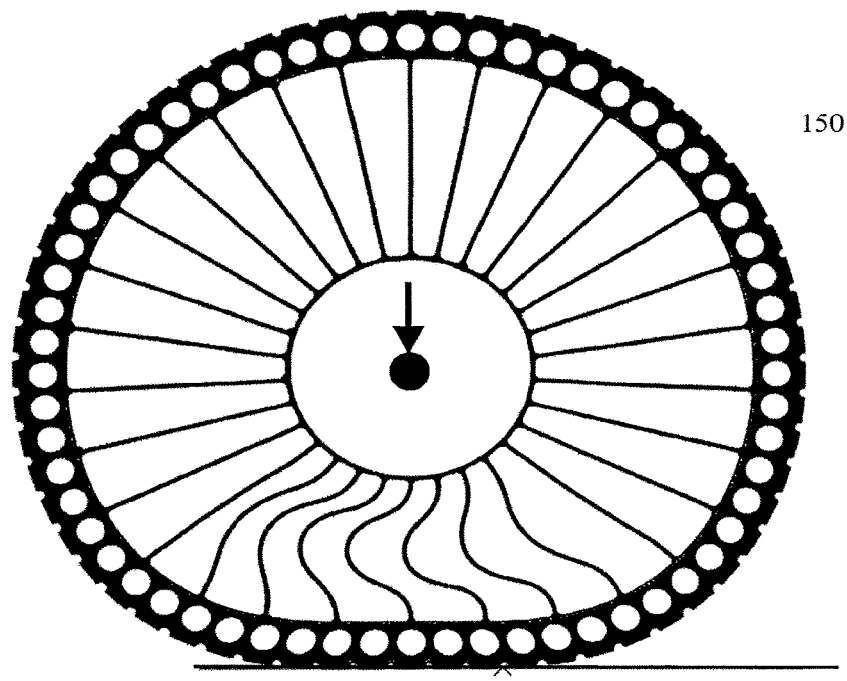

FIG. 18 is a 2D FEM of a tire in accordance with the invention, subjected to a vertical load of 1100 N.

Figure 19:
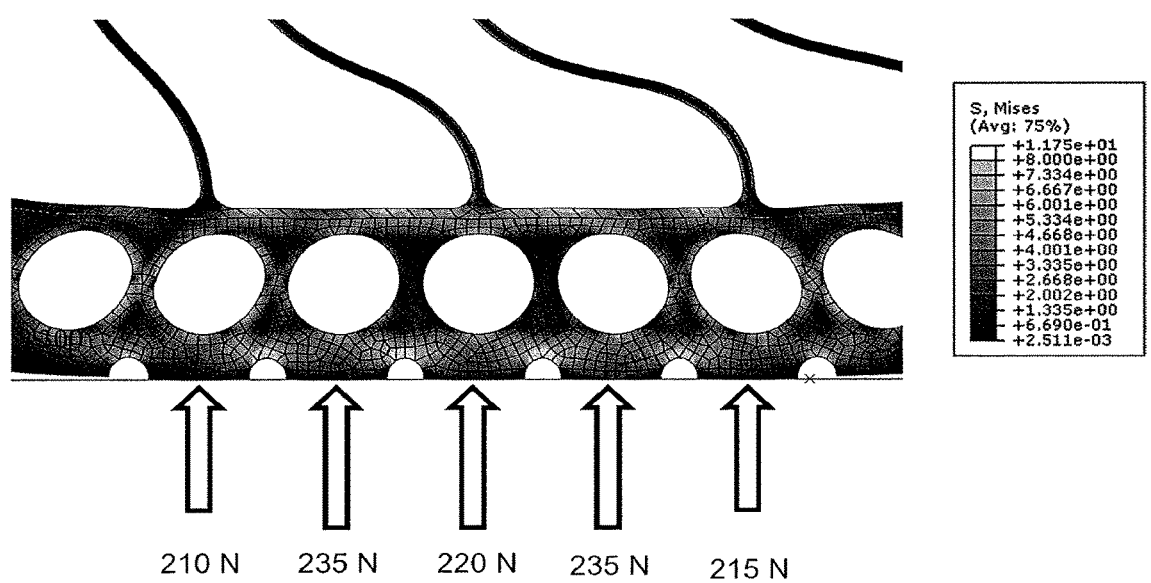

FIG. 19 is closer view of the contact region of the model from FIG. 18, showing contact patch force distribution and Von Mises stress.

FIG. 20 is a plot of tensile stress vs. tensile strain for a preferred homogeneous elastomeric material in accordance with the invention.

FIG. 21 is an isometric view of a third exemplary embodiment of a tire according to the invention.

Figure 22:
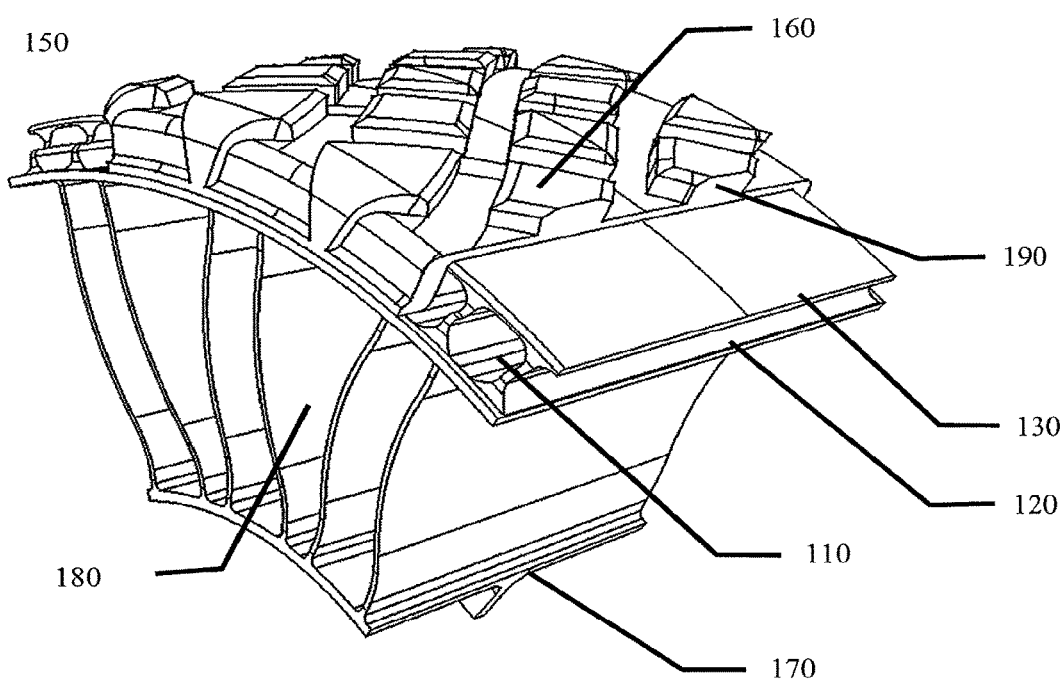

FIG. 22 is an isometric view of a fourth exemplary embodiment of a non-pneumatic tire of the invention.

Figure 23:
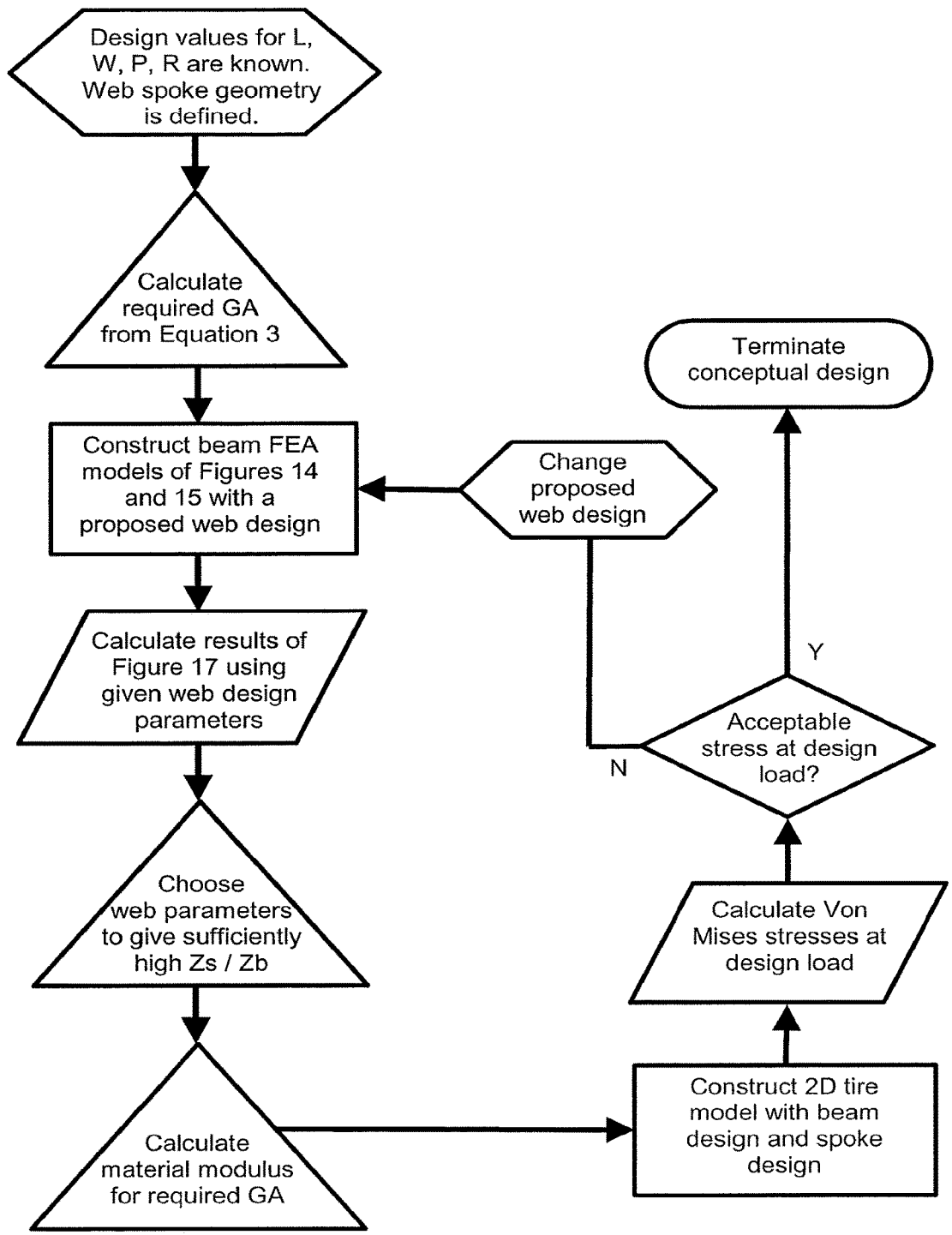

FIG. 23 is a process flow map of a design procedure for a tire in accordance with the invention.

DETAILED DESCRIPTION OF THE INVENTION

Reference will now be made in detail to embodiments of the invention, one or more examples of which are illustrated in the Figures. Each example is provided by way of explanation of the invention, and not meant as a limitation of the invention. For example, features illustrated or described as part of one embodiment can be used with another embodiment to yield still a third embodiment.

Definitions

The following terms are defined as follows for this disclosure, with material properties referring to those at ambient temperature, unless otherwise noted:

"Wheel" or "Hub" refers to any structure for supporting the tire and capable of attachment to a vehicle axis, and such terms are interchangeable herein.

"Modulus" means Young's tensile modulus of elasticity measured per ISO 527-1/-2. "Young's Modulus," "tensile modulus," and "modulus" are used interchangeably herein.

"Secant Modulus" is the tensile stress divided by the tensile strain for any given point on the tensile stress vs. tensile strain curve measured per ISO 527-1/-2.

"Shear Modulus" means the shear modulus of elasticity, calculated by Equation 10, below.

"Tensile Strain at Break" means the tensile strain corresponding to the point of rupture as measured by ISO 527-1/-2.

"Flex Fatigue" is the flexural stress fatigue limit, measured by ASTM D671.

"Design Load" of a tire is the usual and expected operating load of the tire.

"Design contact length" is the contact length over a substantially flat surface when loaded to design load.

Figure 1:
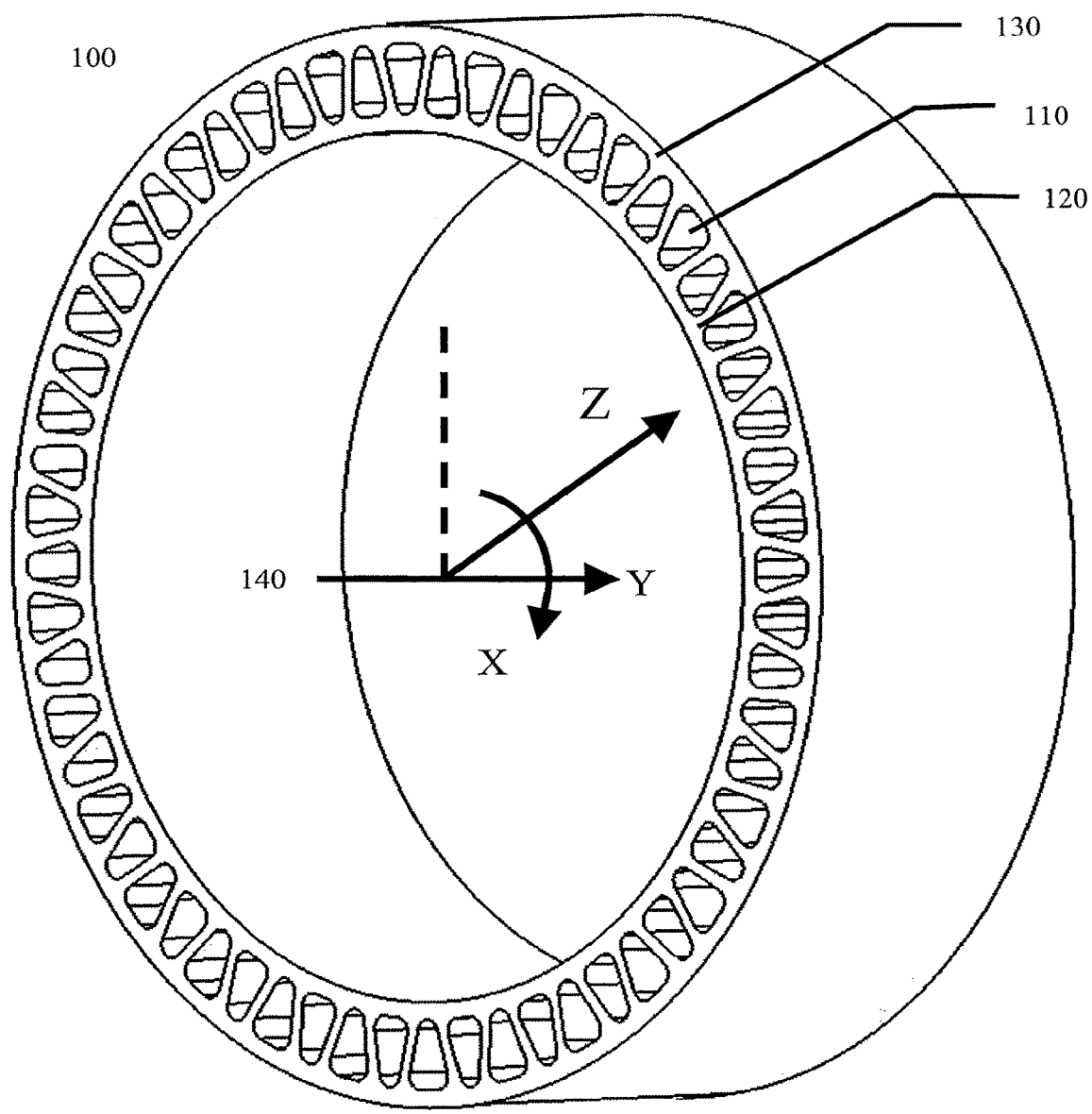
FIG. 1 is an isometric view of an annular beam of the invention, along with the coordinate system defined by the invention.

The coordinate system defined by the invention is shown in FIG. 1:

The circumferential direction is the X direction.
The axial direction is the Y direction, coincident with the rotation axis 140.
The radial direction is the Z direction.
The tire equatorial plane is the plane defined by the x-z axes.

DETAILED DESCRIPTION

A non-pneumatic tire employing an annular beam of homogeneous material is represented herein by structural two dimensional Finite Element Models (FEM). This section first provides an overall description of the invention; then, a preferred design practice for developing a tire having desired performance characteristics will be disclosed. This procedure employs FEM.

FIG. 1 shows an isometric view of an annular beam 100. The beam defines a radial direction (Z), a circumferential direction (X) and an axial direction (Y), which is coincident with the axis of rotation 140. The beam is of monolithic construction, composed of one homogeneous material. The beam consists of at least a first circumferentially continuous band 120, lying on a radially inward extent of a web structure 110. At least a second continuous band 130 lies on a radially outward extent of the web structure. In a preferred embodiment, the beam is constructed of an elastomer of specific non-linear mechanical material properties, and having a modulus of at least 90 MPa, and preferably between 150 to 350 MPa.

Figure 2:
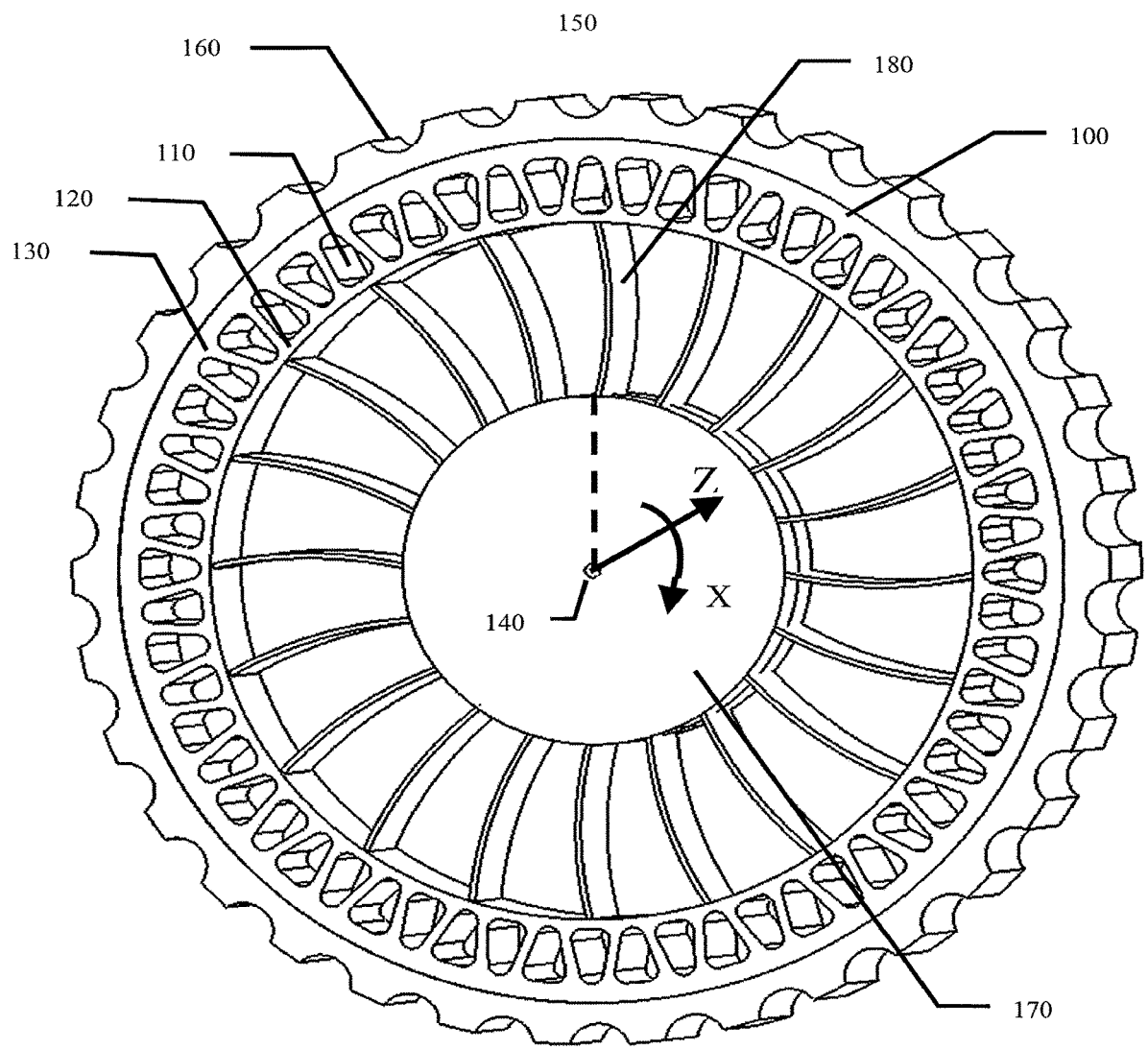
FIG. 2 is an isometric view of a non-pneumatic tire of the invention.

FIG. 2 shows an isometric view of the annular beam 100, embodied in a non-pneumatic tire 150. The annular beam is connected to a central hub 170 by a plurality of web spokes 180 that traverse the hub and beam in the axial direction. The spokes have a sheet-like geometry in this example, yet other embodiments will be disclosed. The tire is loaded by and revolves around axis 140. A ground contacting portion 160 lies on a radially outward extent of the annular beam.

Figure 3:
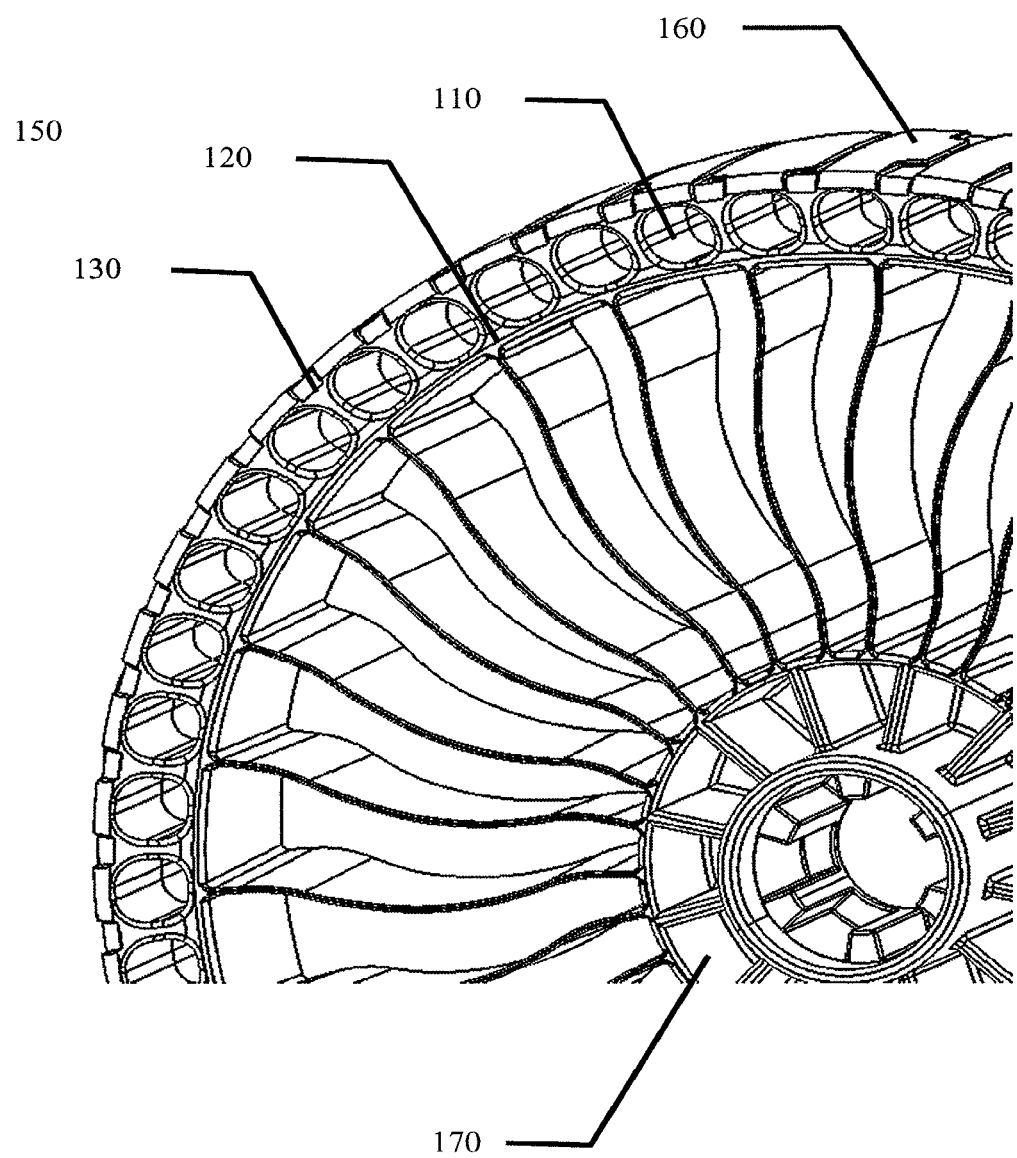
FIG. 3 is an isometric view of an exemplary embodiment of a non-pneumatic tire of invention.

FIG. 3 shows an isometric view of an exemplary embodiment of a non-pneumatic tire 150, for which the outer diameter is around 10 to 13 inches and the width in the axial direction is around 3 to 6 inches. In this figure, the entire structure has been designed such that it is suitable for one-shot high pressure injection molding. Thus, draft angles and radii for thermoplastic molding have been added. Additionally, the structure has been designed with wall thicknesses appropriate for this type of production process. Circumferentially continuous bands 120 and 130, and web structure 110 have therefore been defined accordingly. These features do not intend to limit the scope of this application in any way. They are provided to illustrate one particular best practice as applied to one specific production process.

Figure 4:
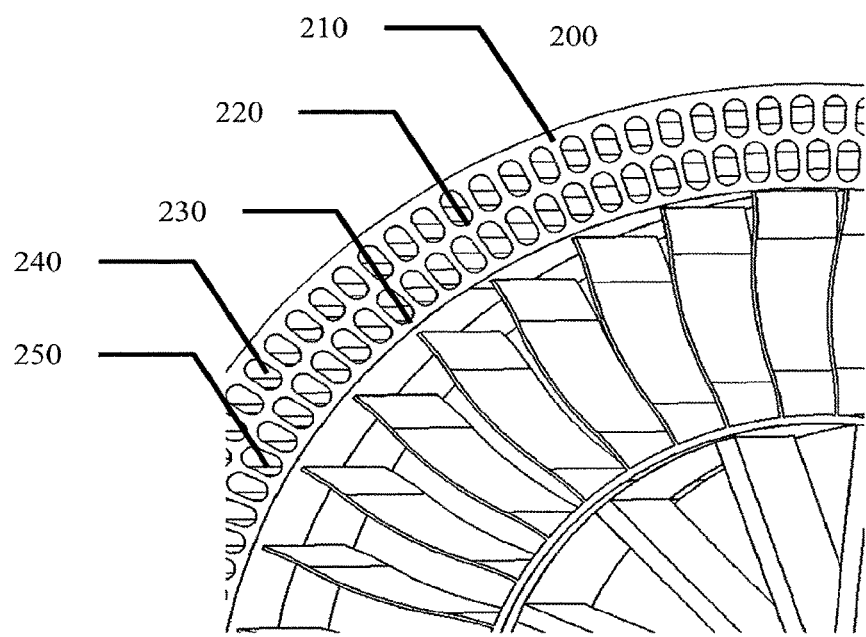
FIG. 4 is an isometric view of a second exemplary embodiment of a non-pneumatic tire of the invention.

FIG. 4 shows an isometric view of a second exemplary embodiment of a tire 200 in accordance with the invention. The annular beam includes three circumferentially continuous bands and a first web structure 240 between band 210 and band 220, and a second web structure 250 between band 220 and band 230. This type of design is particularly suited for applications having a larger outer diameter, along with a larger load capacity. As will be disclosed, such design freedoms enable the tire designer to tune the stiffness of the annular beam by geometry changes, as opposed to adding plies or other composite materials.

Figure 5:
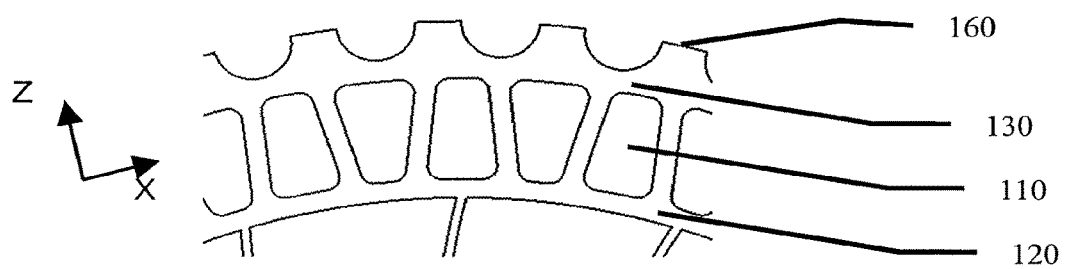
FIG. 5 is an x-z plane equatorial cross-section view of an alternative arrangement of the web connecting two continuous bands in the annular beam.
Figure 6:
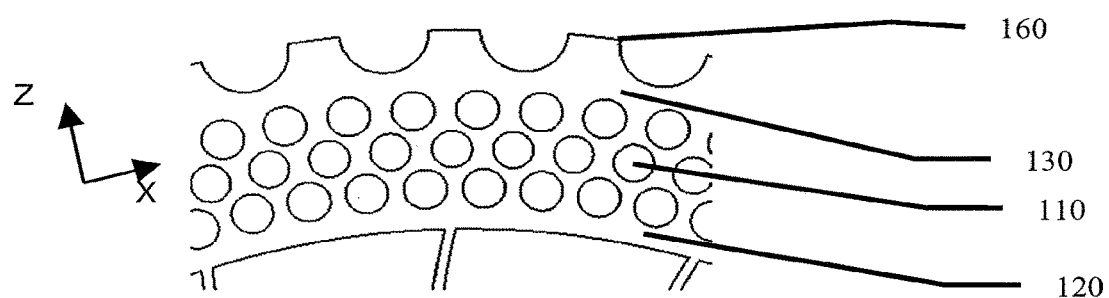
FIG. 6 is an equatorial view of a third arrangement of the web connecting two continuous bands in the annular beam.
Figure 7:
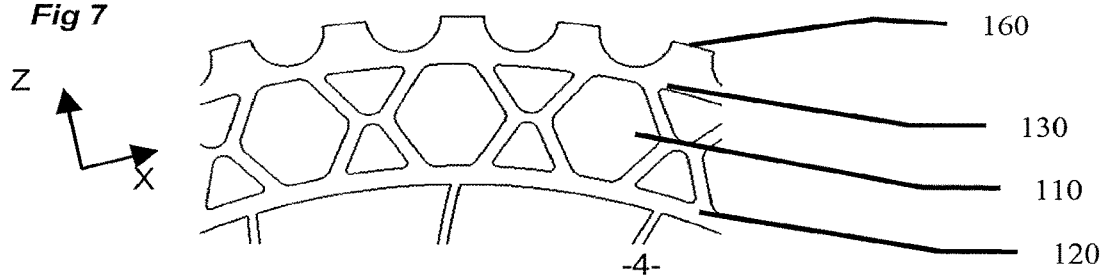
FIG. 7 is an equatorial view of a fourth arrangement of the web connecting two continuous bands in the annular beam.

Many different annular beam web structures are possible. While not exhaustive, additional patterns are shown in FIGS. 5, 6, and 7. In each of these figures, a first circumferentially continuous band 120 lies on a radially inward extent of a web structure 110, with a second continuous band 130 lying on a radially outward extent of the web structure, and a tread contacting portion 160 lying on a radially outward extent of the continuous band 130. FIG. 5 shows a cross section in the equatorial x-z plane of webbing consisting of column elements of alternating inclination. FIG. 6 shows a web structure with a circular geometry. FIG. 7 shows webbing having a geometric pattern of triangular and hexagonal elements. These web structures, and others that result from combinations and additions of these designs, are intended to fall within the scope of this application, per the design approach and optimization that will be disclosed.

Figure 8:
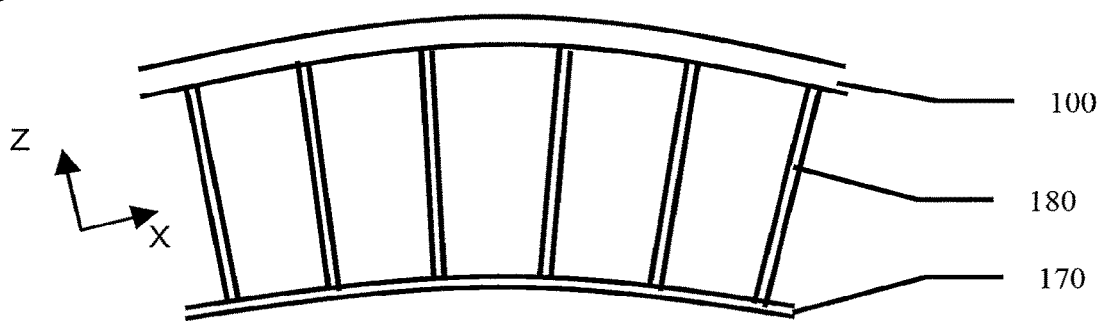
FIG. 8 is an x-z plane equatorial view of a radial arrangement of the web spokes that connecting the annular beam to the central hub.
Figure 9:
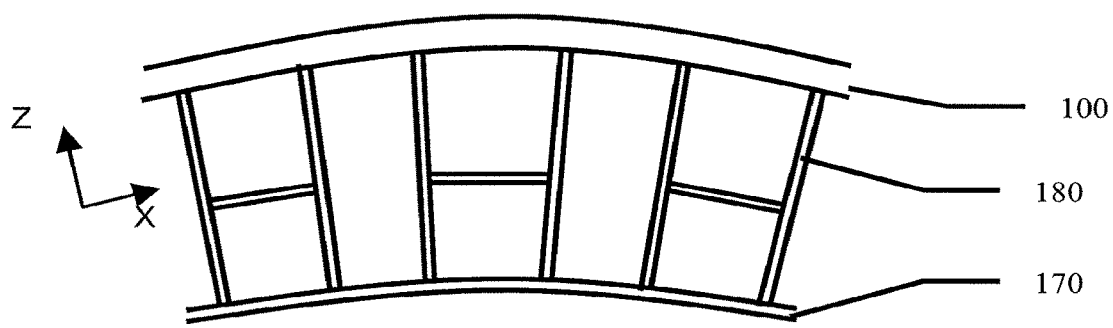
FIG. 9 is an equatorial view of a second arrangement of the web spokes.
Figure 10:
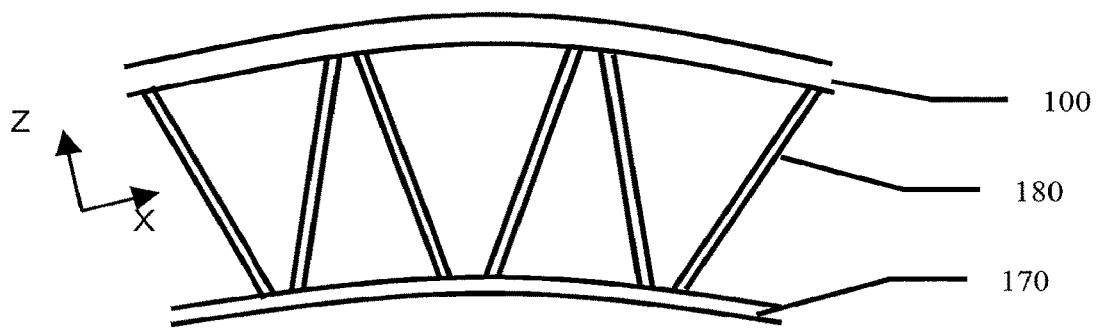
FIG. 10 is an equatorial view of a third arrangement of the spokes.
Figure 11:
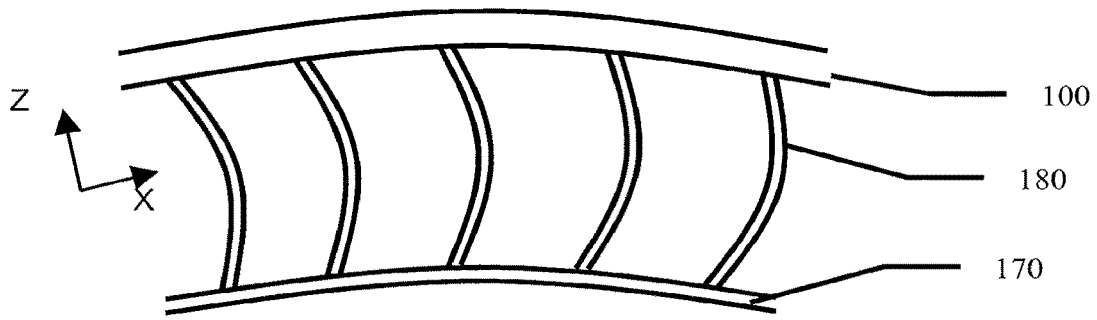
FIG. 11 is an equatorial view of a fourth arrangement of the spokes.

Many different spoke web designs are possible. While not exhaustive, four general patterns are shown in the tire x-z equatorial plane in FIGS. 8, 9, 10, and 11. In each figure, web spokes 180 connect a hub 170 to an annular beam 100. FIG. 8 shows a radial pattern. FIG. 9 is a design in which pairs of spokes are connected. FIG. 10 shows a diagonal pattern. FIG. 11 gives a curved radial design, in which the spokes have modest departures from the radial direction. The spokes can also be inclined relative to the axial direction and otherwise designed to facilitate demolding, which is most naturally done in the axial sense in the spoke web region. These designs, and others that result from combinations of these, are all intended to fall within the scope of this invention.

A preferred design practice will now be disclosed. The inventor has found relationships that relate the annular beam shear stiffness to bending stiffness, such that excellent contact patch behavior is achieved. This is done within the confines of a monolithic annular beam composed of a homogeneous material, yet having the aforementioned web geometry. When connected to a central wheel via webbed spokes, also previously described, the structure has a high load to mass ratio, yet keeps the simplicity of a homogeneous material, with no need for inextensible membranes or other composites or reinforcing elements.

A preferred tire contact pressure is substantially constant through the length L of the contact patch. To achieve this, an annular beam of radius R should be designed such that it develops a constant pressure when deformed to a flat surface. This is analogous to designing a straight beam which deforms to a circular arc of radius R when subjected to a constant pressure which is equal to the contact pressure of the aforementioned annular beam. However, a homogeneous beam of solid cross section does not behave like this. To create this desired performance, beam bending stiffness and beam shear stiffness can be intelligently designed using a web geometry. A method for doing so will now be disclosed, using standard nomenclature employed in typical engineering textbooks.[1]

Equation 1 gives the relationship of shear force variation to an applied distributed load on a differential beam element:

$$-\frac{dV}{dx} = W \tag{1}$$

Where:
V=transverse shear force
W=Constant distributed load per unit length
x=beam length coordinate The deflection of such a beam due to shear deformation alone can be estimated by combining Equation 1 with other known relationships. This step is not taken by those of ordinary skill in the art of mechanics, as shear deflection is usually ignored in calculating beam deflections. Adding relations between shear force, shear stress, shear modulus, and cross-sectional area, Equation 2 can be derived:

$$\frac{d^2z}{d^2x} = \frac{W}{GA} \tag{2}$$

Where:
G=beam shear modulus
A=effective beam cross sectional area
z=transverse beam deflection For small deflections, $$\frac{d^2z}{d^2x}$$

is equal to the inverse of the beam deformed curvature. Making this substitution, which is not made by one of ordinary skill in the art, and considering a beam of unit depth, one obtains Equation 3:

$$P = \frac{GA}{R} \tag{3}$$

Where:
G=beam shear modulus
R=deformed beam radius of curvature
A=effective beam cross sectional area, with unit depth
P=Constant distributed pressure, with unit depth Equation 3 is very important. A straight beam of shear modulus G and effective cross sectional area A, subjected to homogeneous pressure P, will deform into the shape of an arc of radius R, provided shear deflection predominates.

Figure 12:
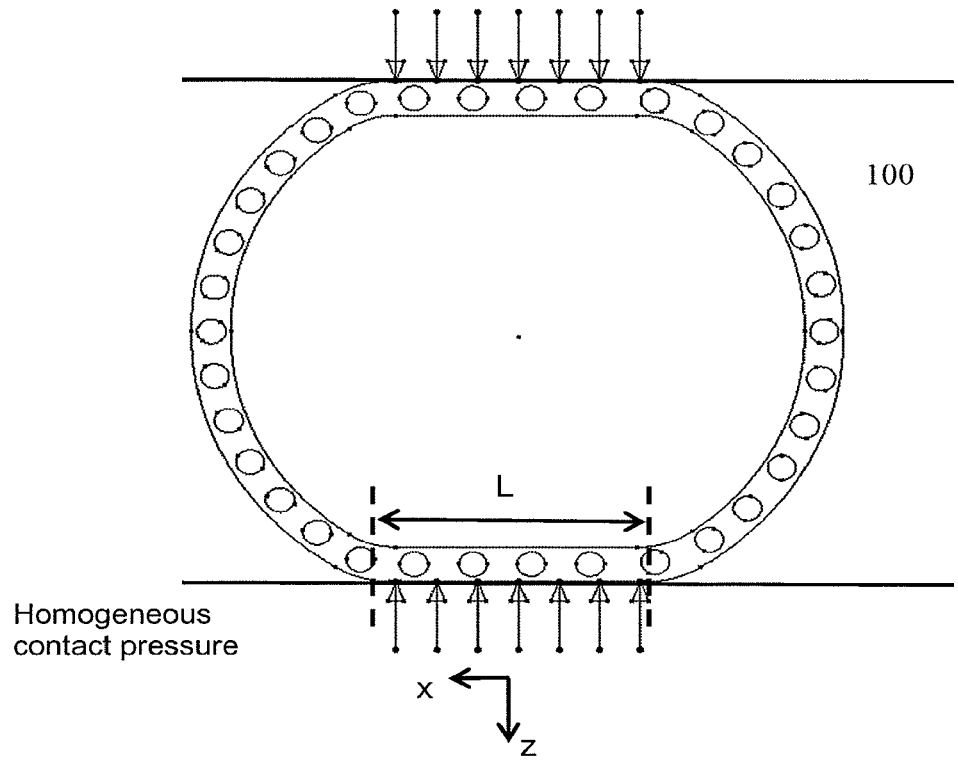
FIG. 12 is an equatorial view of the annular beam, in contact with two parallel flat contact surfaces.

Similarly, an annular beam of radius R, designed such that shear deformation predominates, that is deflected against a flat contact surface, will develop a homogeneous contact pressure P. This is shown in FIG. 12, in which an annular beam according to the invention is placed in contact between two parallel plates. Along a design contact length L, a constant contact pressure is developed. As mentioned, this is analogous to the straight beam that deforms to the shape of an arc of radius R, which subjected to the homogeneous pressure P.

Figure 13:
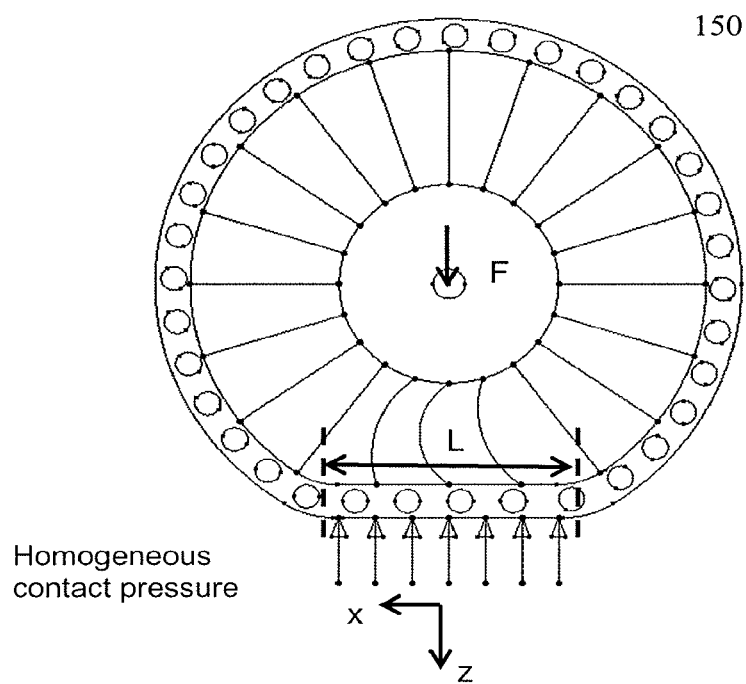
FIG. 13 is an equatorial view of the tire, in contact with a flat surface.

A constant pressure through design contact length L is a highly desired performance attribute. An annular beam with this attribute could be advantageously employed in conveyor belt systems, and wheels used in track drive systems which have opposing contact patches. It is particularly useful when embodied in a non-pneumatic tire, as shown in FIG. 13. Here, the annular beam is attached to a central hub by a spoke web geometry. When a design load is applied at the hub, the beam deforms over a design contact patch length L, develops a homogeneous contact pressure, and passes the load to the hub via tension in the web spokes.

The present invention achieves the desired performance of FIG. 13 by designing the annular beam with a web structure that generally traverses the beam in the axial direction. With this design feature, shear deflection can be larger than bending deflection, and the desired contact patch performance can be obtained.

The inventor has found that analysis of a straight beam is less cumbersome than an annular beam; therefore the first part of the design process employs a straight beam geometry subjected to a constant pressure, in order to design the web structure. Final design verification then includes a complete model, as will be disclosed.

Towards this end, the first step in developing a design process is to calculate the deflection due to bending and the deflection due to shear of a simply supported straight beam subjected to a constant pressure. Equation 4 gives the center deflection due to bending; Equation 5 gives the center deflection due to shear; Equation 6 solves for shear deflection divided by bending deflection:

$$z_b = \frac{5}{384} \frac{PL^4}{EI} \quad (4)$$

$$z_S = \frac{1}{4} \frac{PL^2}{GA} \quad (5)$$

$$\frac{z_s}{z_b} = 19.2 \frac{EI}{L^2} \frac{1}{GA} \quad (6)$$

Where:
$z_b$=beam center deflection due to bending
$z_s$=beam center deflection due to shear
L=beam length, which is about equal to the tire contact length
E=beam tensile modulus
I=beam moment of inertia The result of Equation (6) is a dimensionless term that describes an important aspect of the annular beam behavior. It is a geometrical term that, for homogeneous materials, is independent of modulus. As $z_s/z_b$ becomes larger, shear deflection predominates. As shear deflection predominates, Equation (3) becomes valid and the desired performance of FIG. 13 is obtained.

Shear deflection is usually assumed to be large compared to bending deflection, and shear deflection is neglected. Consequently, one of ordinary skill in the art of mechanics is not familiar with the result of Equation (6). Beam bending stiffness must be relatively high, and beam shear stiffness must be relatively low in order to have $z_s/z_b$ be acceptably high.

The next step is to define a procedure to relate beam design variables to the terms of Equation 6. This is accomplished by a Finite Element Analysis (FEA) on the geometry of the annular beam. While many standard FEA packages are suitable for this analysis, Abaqus was used for analyses in this application. To analyze the annular beam design, the following steps were followed:
Representation of the annular beam as a 2D straight beam.
Definition of the beam geometry. Beam length, L, equals the design tire contact patch length in the x direction.

The beam webbing design and associated dimensions are also included as model parameters.
Two small-deflection plane stress 2D FEA calculations are performed.
i. Effective shear modulus calculation. This is done by constraining the bottom side of the beam and applying a uniform shear force to the top face.
ii. Total center beam deflection calculation. This is done by simply supporting the beam and applying a uniform pressure to the top face such that the beam deflects in the z axis.

FEM used in (i) and (ii) are illustrated in FIGS. 14 and 15, respectively.

From the FEM output of the model of FIG. 15, the beam effective shear modulus can be determined:

$$G_{eff} = \frac{\tau}{\gamma} \quad (7)$$

Where:
τ=applied shear stress at beam top surface
γ=average angular deformation across beam webbing in the z direction.
$G_{eff}$=effective beam shear modulus The effective shear modulus calculation is used with Equation (5) to calculate $z_s$, the beam center deflection due to shear. For a unit depth assumption with the plane stress FEM, the effective beam cross sectional area A for shear deformation calculation equals the beam webbing thickness in the z direction. The webbing between the two continuous bands is much softer in shear than the bands; therefore, the shear strain is higher in the webbing. Since beam deflections in shear depend on the largest shear angle which lies in the beam section, the effective beam cross section area is calculated relative to the total webbing thickness in the z axis.

The second FEA model calculates the total center beam center deflection. By subtracting the deflection due to shear, the deflection due to bending is found. Equation (4) is rearranged to calculate the effective moment of inertia of the beam:

$$z_b = z_t - z_s \quad (8)$$

$$I_{eff} = \frac{5}{384} \frac{PL^4}{Ez_b} \quad (9)$$

Where:
$z_t$=total beam center deflection from FEA calculation
$I_{eff}$=effective beam moment of inertia For homogeneous, isotropic materials, the shear modulus and tensile modulus are related by Poisson's ratio, as given in Equation (10):

$$G = \frac{E}{2(1+\upsilon)} \quad (10)$$

Where:
υ=Poisson's ratio
E=tensile modulus
G=shear modulus

With the effective beam moment of inertia and the effective beam cross-sectional area known, the designer can then model the performance of an annular beam of the same design when used in the context of the present invention. The design procedure is then used to optimize the beam webbing design by employing Equation (6) to calculate the ratio of shear deflection to bending deflection for any design contact patch length L.

An efficient way to employ the FE models of FIGS. 14 and 15 is to normalize the tensile modulus to 1.0. The shear modulus is then defined by Equation (10). In most FE codes, this value can be input as modulus, along with a value for Poisson's ratio. For many thermoplastic and cast elastomers, this dimensionless value is approximately 0.45. Thus, for a normalized tensile modulus, the shear modulus equals about 0.344. A straight-forward example of this design method is now provided.

A simple web design is used in order to illustrate the design procedure. Other web designs could consist of additional variables and more complex geometries. The FEA beam model geometry of FIG. 16 depicts a web structure 110 consisting of circular cut-outs of diameter Dc, with a pace in the x direction between each cut-out of distance p. This web structure is between continuous bands 120 and 130 of thickness t in the z direction. As the distance between the web cutouts decreases, the amount of material removed increases. Therefore, the effective shear modulus decreases. As the distance p approaches cut-out diameter Dc, the shear stiffness approaches zero.

The bending stiffness also decreases as webbing material is removed. However, the bending stiffness does not decrease as rapidly as does the shear stiffness because of the maintenance of the two solid bands of thickness t at the beam outer fibers. A large moment of inertia, therefore, is maintained. For this reason, the shear deflection will become large compared to the bending deflection as the webbing pace is decreased.

FIG. 17 shows FEA results for effective shear modulus $G_{eff}$, and the ratio of shear deflection to bending deflection $z_s/z_b$, as functions of the webbing pace p. The FE models used a tensile modulus normalized to 1.0, and therefore a shear modulus of 0.344. For this example, Dc=10 mm, t=2 mm, and L=60 mm.

For a webbing pace that is very large, the effective shear modulus will asymptotically approach the isotropic value of 0.344. As the webbing pace decreases to 10.0, the effective shear modulus approaches 0. The reason for this is that, when the webbing pace equals the radius of the cutout, the beam becomes discontinuous through the thickness. The resulting structure would be free to displace in shear with no shear force, and the effective shear modulus would be zero. With a webbing pace of 12 mm, there is 2 mm of material between the webbing cutouts, and the resulting $G_{eff}$ is 0.033, which represents a decrease of more than an order of magnitude compared to the isotropic shear modulus of 0.344.

For a webbing pace above 20 mm, the bending deflection becomes larger than the shear deflection. For a webbing pace of 14 mm or below, the shear deflection becomes significantly larger than the bending deflection. In this design region, where shear deflection is high compared to bending deflection, the positive performance attributes shown in FIG. 12 will be attained.

For a specific example, a small tire having an outer radius of 125 mm can be designed using an annular beam as in FIG. 16, with p=12 mm, t=2 mm, and Dc=10 mm. A design contact patch pressure of 0.20 MPa (30 psi) is used as a design input, along with a contact patch length L=60 mm. To attain this value in the design, Equation (3) is used to solve for the needed effective shear stiffness. With a unit depth, the effective shear area of the annular beam used in the FEM results from FIG. 17 is the webbing thickness in the z direction times unit depth. Thus:

$$P = \frac{0.20N(1 \text{ mm unit depth})}{\text{mm}^2} = \frac{G_{eff}(10 \text{ mm})(1 \text{ mm unit depth})}{125 \text{ mm}} \quad (11)$$

$$G_{eff} = 2.5 \text{ MPa}$$

For a webbing pace=12 mm, $G_{eff}$=0.033 for the normalized modulus of FIG. 17. Therefore, the desired actual shear modulus is:

$$G = \frac{2.5 \text{ MPa}}{0.033} = 75 \text{ MPa} \quad (12)$$

From Equation (10) the tensile modulus of the material is should be about 210 MPa.

Therefore, by choosing a homogeneous material with a tensile modulus of 210 MPa, a contact patch pressure of 0.20 MPa will be obtained. The contact length of 60 mm has already been defined as an input to the FE analyses. The design load carrying capacity is defined by multiplying pressure by contact area. For a lawn mower tire, a design load of 1115 N (250 lbs) is required. Thus:

$$W = \frac{F}{LP} = \frac{1115 \text{ N}}{(60 \text{ mm})(0.20 \text{ MPa})} = 93 \text{ mm} \quad (13)$$

Where:
F=design load
L=tire contact patch length in X direction=beam length in FE calculations
P=desired contact pressure
W=contact patch width The second phase involves verification of the annular beam design with a 2D plane stress FEM of a non-pneumatic tire. FIG. 17 shows the deformed geometry of a non-pneumatic tire according to the invention that has a web spacing of 12 mm, with the annular beam geometry as approximately defined in FIG. 16, and material properties about equal to those calculated above.

At a load of 1115 N (250 lbs), and a contact width in the depth direction of 95 mm, the predicted contact force is equally distributed through the contact length, as shown in FIG. 18. This result shows that a web spacing of 12 mm, and hence a $z_s/z_b$ value of 3.8, does indeed give a shear deflection that is sufficiently high compared to bending deflection. Equation 3 becomes operative, and the contact patch pressure is essentially homogeneous.

Additional work by the inventor has shown that a $z_s/z_b$ value of at least about 1.2, and preferably above 2.0, is necessary to obtain a relatively homogeneous pressure throughout the contact length.

This approximate tire size of 10 inch diameter×4 inch width (100 mm) is a common size used for lawn mower and other caster tires. A design load of 250 lbs per tire is very acceptable in this market.

FIG. 18 also shows the Von Mises stress distribution in the deformed geometry. The graduated gray scale of 0 MPa to 8 MPa shows that maximum values of less than 7.4 MPa are obtained with this web geometry at the design load. In order to sustain cyclic stress of this magnitude, a good flex fatigue performance is required. Further, tires are often subjected to impact loads and road hazard impacts that result in very high local strains. A material having a high level of tensile strain at break is desired. For some applications, a flex fatigue limit of 4 MPa is sufficient, with a value above 7 MPa preferred. A tensile strain at break of above 100% is also preferred. These must be combined with a tensile modulus of about 200 MPa.

Examples of materials having these physical characteristics include thermoplastic urethanes such as Elastollan S98A and thermoplastic co-polymers such as Hytrel G5544 and 5556. Some versions of unfilled, plasticized, toughened engineering plastics attain similar capabilities, such as Zytel 351 PHS. Examples of cast polyurethane thermoset materials attaining these characteristics are COIM PET-95A and PET-60D, when cured with curative MBOCA or MCDEA. These are just a few of many examples and are not meant to limit the scope of invention in any way.

The design procedure covered in the preceding paragraphs is suitable for the design and optimization of a large variety of geometries falling within the scope of this application. The above example was a small tire suitable for a lawnmower, with a relatively short contact length. However, larger tires will have longer contact lengths. Equation (6) has the contact length as a squared term in the denominator. To maintain an acceptably high $z_s/z_b$, one strategy is to increase the beam moment of inertia, which is in the numerator of Equation (6).

Increasing the moment of inertia involves increasing the distance between the circumferentially continuous bands and/or increasing the band thickness. FIG. 4 showed one way to do this, while maintaining the relatively constant wall thicknesses required by thermoplastic injection. The tire shown in FIG. 4 has a total annular beam radial thickness that has been greatly increased, while wall thicknesses have been only moderately increased. The higher design load of this tire has been achieved largely due to changes in the geometry of the annular beam, with no need for inextensible membranes, plies, or composites.

Additional work by the inventor has shown that certain elastomeric materials exhibit favorable non-linear stress vs. strain characteristics. One preferred embodiment involves the choice of a material having a very non-linear material behavior, for which the secant modulus decreases with increasing strain. From the definition earlier provided, "modulus" is the initial slope of the stress vs. strain curve, often termed "Young's modulus" or "tensile modulus." Preferred materials have a high Young's modulus that is much greater than the secant modulus at 100% strain, which is often termed "the 100% modulus." This nonlinear behavior provides efficient load carrying during normal operation, yet enables impact loading and large local deflections without generating high stresses.

Some thermoset and thermoplastic polyurethanes have this material behavior. An example of such a favorable material is shown in FIG. 20. The measured stress vs. strain curve of COIM's PET-95A, with curative MCDEA, has a Young's modulus of 205 MPa. However, the secant modulus at 100% strain is only 19 MPa. This is a favorable attribute for the present invention; when following the design principles earlier disclosed, the tire normally operates in the 2 to 5% strain region. In this region, the material is moderately stiff and the slope of the stress vs. strain curve is fairly constant. However, if local deformation occurs due to road hazards or impacts, the material is capable of large strains, without generation of high stresses. This minimizes vehicle shock loading, and enhances tire durability.

Those skilled in the art of elastomer chemistry do not recognize the potential of this material behavior. Elastomers are often used in areas of high imposed strains. As such, testing protocol typically focuses on the performance at high strains, such as 100%, 200%, or more. Mechanical designs that carry load in tension and bending typically do not use one homogeneous elastomer—they employ reinforcements as well. This invention opens this new design space by leveraging this material non-linearity with a favorable mechanical design.

FIG. 21 shows an exemplary embodiment of a tire according to the invention for use in the construction industry. This large tire was designed using the above principles, along with the non-linear material behavior of COIM's PET-95A. With an outer diameter of 1500 mm (60 in) and width of 530 mm (21 in), the tire is capable of a design load of 10,000 kg (22,000 lbs.). It is a replacement for a pneumatic tire/wheel in the dimension 20.5×25. In this embodiment, the tread, circumferential band, spokes, and hub are all composed of PET-95A. The contact pressure was designed at 0.5 MPa (74 psi). The circumferentially continuous bands have a thickness of 15 mm (0.6 inches), and the web thickness is 85 mm (3.4 inches). Simulated impact loadings do not result in high material stresses, due to the non-linear stress vs. strain curve, while material strains are in the 2-5% range during normal operation. Total weight of this non-pneumatic tire/wheel is 275 kg (595 lbs.). This weight is less than the mounted assembly weight of pneumatic tires of similar size and design load. Vertical stiffness and contact pressure are designed to be similar to the comparable pneumatic tire.

A tread contacting region can be affixed to a radially outer extent of the annular beam in many ways. The tread can be composed of a different material and can extend around the part or all of the axial extents of the annular beam. This is shown in FIG. 22. The tread is designed such that the annular beam web portion 110 is encapsulated and covered by the tread material 190. Additionally, the lateral extents of the web area have been modified to mate with and indeed provide mechanical interlocking for the tread material. In this design, the web portion is protected from rocks, dirt, or other debris, This illustrates one preferred embodiment, yet is not intended to limit the scope of the claim of this application.

The design procedure previously described can be represented as a decision flow-chart, shown in FIG. 23. Using this approach, a human designer or a computer algorithm can optimize a given annular beam web design for a specific design requirement as embodied in a non-pneumatic tire.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention.

REFERENCES

1. Muvdi, B. B., McNabb, J. W., (1980). *Engineering Mechanics of Materials*, Macmillan Publishing Co., Inc., New York, N.Y., "Shear and Bending Moment in Beams," pp 23-31, and "Deflections of Beams", pp 266-333.

What is claimed is:

1. A non-pneumatic tire comprising:
a monolithic annular beam;
a hub spaced radially from the annular beam; and
a plurality of spokes that extend from the annular beam to the hub such that, when the non-pneumatic tire is loaded, upper ones of the spokes above an axis of rotation of the non-pneumatic tire are in tension;
the annular beam being elastomeric, the annular beam being configured to deflect more by shearing than by bending at the contact patch of the non-pneumatic tire;
and wherein the non-pneumatic tire comprises thermoplastic elastomeric material forming at least part of the spokes and having a flex fatigue limit of at least 4 MPa according to ASTM D671.

2. The non-pneumatic tire of claim 1, wherein each of the spokes extends from the annular beam to the hub without being intersected at more than one point.

3. The non-pneumatic tire of claim 2, wherein each of the spokes extends from the annular beam to the hub without being intersected.

4. The non-pneumatic tire of claim 1, wherein each of the spokes extends from the annular beam to the hub without being connected to the other ones of the spokes at more than one point between the annular beam and the hub.

5. The non-pneumatic tire of claim 1, wherein each of the spokes is unconnected to the other ones of the spokes from the annular beam to the hub.

6. The non-pneumatic tire of claim 3, wherein the flex fatigue limit of the thermoplastic elastomeric material is at least 7 MPa.

7. The non-pneumatic tire of claim 3, wherein a Young's modulus of the thermoplastic material is at least 90 MPa.

8. The non-pneumatic tire of claim 3, wherein the thermoplastic elastomeric material is a thermoplastic co-polymer.

9. The non-pneumatic tire of claim 1, wherein the thermoplastic elastomeric material forms at least part of the annular beam.

10. The non-pneumatic tire of claim 9, wherein the annular beam and the spokes are entirely formed of the thermoplastic elastomeric material, thermoplastic elastomeric material.

11. The non-pneumatic tire of claim 1, wherein the annular beam comprises:
an outer annular portion;
an inner annular portion; and
a shearing annular portion between the outer annular portion and the inner annular portion of the annular beam.

12. The non-pneumatic tire of claim 11 wherein the annular beam comprises a plurality of voids distributed in a circumferential direction of the annular beam.

13. A process for manufacturing a non-pneumatic tire that comprises:
a monolithic annular beam;
a hub spaced radially from the annular beam; and
a plurality of spokes that extend from the annular beam to the hub such that, when the non-pneumatic tire is loaded, upper ones of the spokes above an axis of rotation of the non-pneumatic tire are in tension;
the annular beam being elastomeric, the annular beam being configured to deflect more by shearing than by bending at the contact patch of the non-pneumatic tire;
the process comprising:
forming the annular beam; and
forming the spokes; and
wherein the non-pneumatic tire comprises thermoplastic elastomeric material forming at least part of the spokes.

14. The process of claim 13, wherein each of the spokes is unconnected to the other ones of the spokes from the annular beam to the hub.

15. The process of claim 14, wherein the thermoplastic elastomer material has a flex fatigue limit of at least 4 MPA according to ASTM D671.

16. A non-pneumatic tire comprising:
an annular beam configured to deflect at a contact patch of the non-pneumatic tire with a ground surface, the annular beam comprising:
an outer annular portion;
an inner annular portion: and
a shearing annular portion between the outer annular portion and the inner annular portion of the annular beam;
the outer annular portion, the inner annular portion, and the shearing annular portion of the annular beam being elastomeric, the annular beam being configured to deflect more by shearing than by bending at the contact patch of the non-pneumatic tire;
a hub spaced radially from the annular beam; and
a plurality of spokes that extend from the annular beam to the hub such that, when the non-pneumatic tire is loaded, upper ones of the spokes above an axis of rotation of the non-pneumatic tire are in tension;
the annular beam being elastomeric, the annular beam being configured to deflect more by shearing than by bending at the contact patch of the non-pneumatic tire;
and wherein the non-pneumatic tire comprises thermoplastic elastomeric material forming at least part of the spokes and having a flex fatigue limit of at least 4 MPa according to ASTM D671.

* * * * *